US010527861B2

(12) United States Patent
Horiguchi et al.

(10) Patent No.: US 10,527,861 B2
(45) Date of Patent: Jan. 7, 2020

(54) COLOR SEPARATION PRISM AND IMAGING DEVICE

(71) Applicant: PANASONIC INTELLECTUAL PROPERTY MANAGEMENT CO., LTD., Osaka (JP)

(72) Inventors: Shuichi Horiguchi, Kanagawa (JP); Masahito Oka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 54 days.

(21) Appl. No.: 15/328,665

(22) PCT Filed: Jul. 30, 2015

(86) PCT No.: PCT/JP2015/003839
§ 371 (c)(1),
(2) Date: Jan. 24, 2017

(87) PCT Pub. No.: WO2016/056157
PCT Pub. Date: Apr. 14, 2016

(65) Prior Publication Data
US 2017/0219834 A1    Aug. 3, 2017

(30) Foreign Application Priority Data

Oct. 7, 2014    (JP) ................................. 2014-206776

(51) Int. Cl.
*G02B 27/14* (2006.01)
*G02B 5/20* (2006.01)
(Continued)

(52) U.S. Cl.
CPC ........... *G02B 27/141* (2013.01); *G02B 5/208* (2013.01); *G02B 27/1013* (2013.01);
(Continued)

(58) Field of Classification Search
CPC . G02B 5/00; G02B 5/003; G02B 5/04; G02B 5/20; G02B 5/205; G02B 5/208;
(Continued)

(56) References Cited

U.S. PATENT DOCUMENTS

| 3,659,918 | A | * | 5/1972 | Tan ..................... G02B 27/1013 313/371 |
| 6,141,105 | A | * | 10/2000 | Yahashi ............... G01B 11/005 356/623 |
| 6,542,193 | B1 | * | 4/2003 | Yoshikawa ........ G02B 27/1013 348/338 |
| 7,576,932 | B2 | * | 8/2009 | Vandorpe ................. G02B 5/04 359/834 |

(Continued)

FOREIGN PATENT DOCUMENTS

| JP | 2009-39510 | 2/2009 |
| JP | 5418707 | 2/2014 |

OTHER PUBLICATIONS

International Search Report, along with English-language translation thereof, in PCT/JP2015/003839 dated Oct. 20, 2015.

*Primary Examiner* — Thong Q Nguyen
(74) *Attorney, Agent, or Firm* — Greenblum & Bernstein, P.L.C.

(57) ABSTRACT

A color separation prism includes a filter, a first prism, a second prism, and a third prism. The first prism allows incidence of light transmitted through the filter, and the first reflective film reflects a first color component of the visible light and a part of the invisible light, among the light beams incident on the first prism. The second prism emits the light reflected by a second reflective film, and the second reflective film reflects the second color component of the visible light and a part of the invisible light, among the light beams incident on the second prism. The third prism emits the light transmitted through the second reflective film. The first reflective film and the second reflective film allocate the invisible light and the visible light emitted from each prism so as to obtain approximately uniform amount of the light.

9 Claims, 4 Drawing Sheets

(51) Int. Cl.
*G02B 27/10* (2006.01)
*H04N 5/335* (2011.01)
*H04N 9/097* (2006.01)

(52) U.S. Cl.
CPC ........... *G02B 27/145* (2013.01); *H04N 5/335* (2013.01); *H04N 9/097* (2013.01); *H04N 2209/049* (2013.01)

(58) Field of Classification Search
CPC . G02B 5/22; G02B 5/26; G02B 5/265; G02B 5/28; G02B 5/281; G02B 5/282; G02B 5/283; G02B 27/00; G02B 27/10; G02B 27/1006; G02B 27/1013; G02B 27/106; G02B 27/12; G02B 27/126; G02B 27/14; G02B 27/141; G02B 27/142
See application file for complete search history.

(56) References Cited

U.S. PATENT DOCUMENTS

| | | | |
|---|---|---|---|
| 9,065,994 B2* | 6/2015 | Takemoto | H04N 5/2254 |
| 2001/0021011 A1* | 9/2001 | Ono | G06T 7/586 |
| | | | 356/3 |
| 2005/0027166 A1* | 2/2005 | Matsumoto | A61B 1/041 |
| | | | 600/162 |
| 2008/0239501 A1* | 10/2008 | Saita | G02B 5/04 |
| | | | 359/634 |
| 2008/0251694 A1 | 10/2008 | Tanimoto et al. | |
| 2009/0021739 A1* | 1/2009 | Tsujita | A61B 1/00163 |
| | | | 356/407 |
| 2009/0079834 A1* | 3/2009 | Otsu | H04N 5/33 |
| | | | 348/169 |
| 2011/0205651 A1 | 8/2011 | Yamano et al. | |

* cited by examiner

COLOR SEPARATION PRISM AND IMAGING DEVICE

TECHNICAL FIELD

The present invention relates to a color separation prism and an imaging device. For example, a color separation prism, which separates light from an object into three primary colors.

BACKGROUND ART

Recently, a method of performing diagnosis has attracted attention, in which indocyanine green (ICG) is administrated into a body as an optical contrast agent, the ICG is excited by irradiating excitation light, or the like, a fluorescence image of near infrared emitted by the ICG is imaged with a subject image, and the image is observed.

Regarding the method, an imaging device including an aperture diaphragm, which images a fluorescence observed image emitted from an observed part of a subject by irradiating excitation light, with an subject image by the irradiating light, has been known (refer to PTL 1).

CITATION LIST

Patent Literature

PTL 1: Japanese Patent No. 5418707

In the imaging device disclosed in PTL 1, in a case in which subjects including the wavelength ranges of visible light and invisible light are imaged as the same image, color reproducibility and resolution are not sufficient.

SUMMARY OF THE INVENTION

The invention is made in consideration of the above described matter, and is to provide a color separation prism and an imaging device which are capable of improving color reproducibility and resolution in wavelength ranges of the visible light and the invisible light.

The color separation prism of the invention separates the light from the object into three primary colors. The color separation prism includes a filter, a first prism, a first reflective film, a second prism, a second reflective film, and a third prism. Light from the object is incident on the filter, and the filter transmits a part of visible light from the object and invisible light of a predetermined wavelength band from the object. The light transmitted through the filter is incident on the first prism. The first reflective film is formed on the first prism. The light transmitted through the first reflective film is incident on the second prism. The second reflective film is formed on the second prism. The light transmitted through the second reflective film is incident on the third prism. The first prism emits the light reflected from the first reflective film to a first imaging element. The first reflective film reflects a first color component of the visible light and a part of the invisible light, and transmits a second color component and a third color component of the visible light and remnant of the invisible light, among the light beams incident on the first prism. The second prism emits the light reflected from the second reflective film to a second imaging element. The second reflective film reflects the second color component of the visible light and a part of the invisible light, and transmits the third color component and remnant of the invisible light, among the light beams incident on the second prism. The third prism emits the light transmitted through the second reflective film to a third imaging element. The first reflective film and the second reflective film allocate the invisible light being emitted to the first imaging element, the second imaging element, and the third imaging element so as to obtain approximately uniform amount of the light, and allocate the visible light being emitted to the first imaging element, the second imaging element, and the third imaging element so as to obtain approximately uniform amount of light.

The imaging device of the invention includes the color separation prism described above which separates the light from the object into three primary colors, and the first imaging element, the second imaging element, and the third imaging element which capture the optical image of the light separated by the color separation prism.

According to the invention, color reproducibility and resolution in the wavelength range of the visible light and the invisible light can be improved.

DESCRIPTION OF EMBODIMENTS

Hereinafter, exemplary embodiment s of the invention will be described with reference to drawings.

(History for Obtaining One Aspect of Invention)

Since an imaging device disclosed in PTL 1 is a single plate type camera using one imaging element, color reproducibility and resolution of the imaging image are not sufficient.

For example, in an extirpation surgery of cancer (for example, breast cancer), in a state in which IGC is administrated to a patient and lymph nodes, which are easily metastasized, are visualized, a near infrared fluorescent part is imaged. In this case, the near infrared fluorescent part is not easily and accurately discriminated with the single plate type camera.

Meanwhile, in a triple plate type camera including three imaging elements in the related art, color reproducibility or resolution in a wavelength range of invisible light is not considered. Therefore, even when the triple plate type camera is used, it is assumed that the near infrared fluorescent part is not easily and accurately discriminated.

Hereinafter, the color separation prism and the imaging device which are capable of improving color reproducibility and resolution in the wavelength ranges of the visible light and the invisible light will be described.

EXEMPLARY EMBODIMENT

Figure 1:
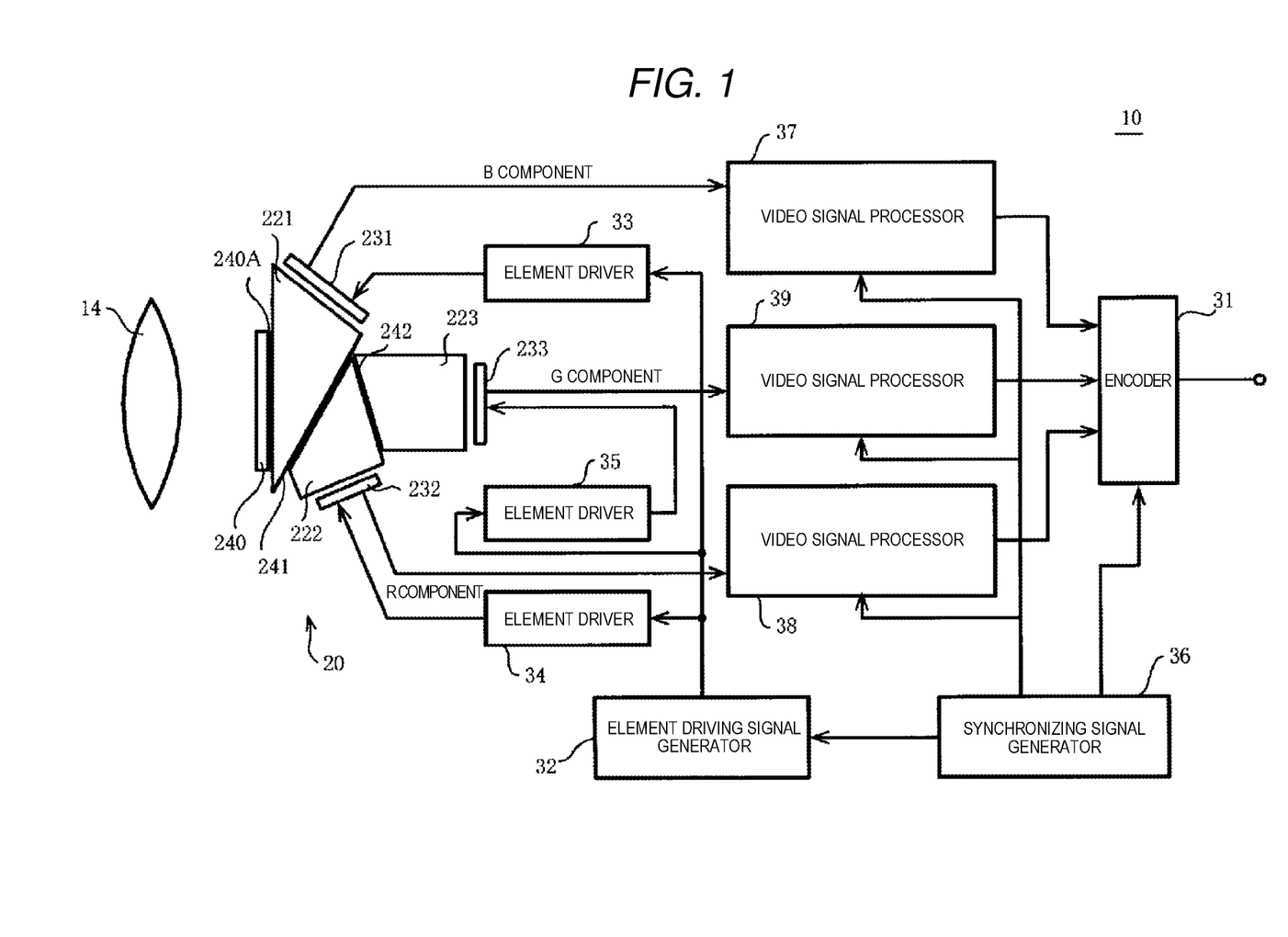
FIG. 1 is a perspective view illustrating an example of a configuration of an imaging device in an exemplary embodiment.

FIG. 1 is a perspective view illustrating an example of a configuration of imaging device 10 in an exemplary embodiment. Imaging device 10 includes lens 14, color separation prism 20, encoder 31, element driving signal generator 32, element drivers 33, 34, and 35, synchronizing signal generator 36, and video signal processors 37, 38, and 39.

Color separation prism 20 includes blue color separation prism 221, red color separation prism 222, and green color separation prism 223, imaging elements 231, 232, and 233, infrared (IR) cut filter 240, blue reflective film 241, and red reflective film 242.

Blue color separation prism 221 is an example of a first prism. Red color separation prism 222 is an example of a second prism. Green color separation prism 223 is an example of a third prism. Blue reflective film 241 is an example of the first reflective film.

Imaging device 10 is applied to, for example, an infrared observation camera system which images a part (affected area) to be operated in a body of a patient. An image imaged by imaging device 10 (for example, video signal) is shown in, for example, a monitor (not illustrated), and assists a surgical operation by a doctor. The color separation prism is applied to, for example, a color separation prism for medical use.

Lens 14 is provided in front of color separation prism 20, and focuses light (mainly, reflecting light) from an object to be imaged. The focused light is incident on color separation prism 20.

Color separation prism 20 is, for example, one prism type color separation prism, and separates incident light guided by lens 14 into three primary colors of blue (B), red (R), and green (G). In color separation prism 20, for example, IR cut filter 240 is disposed on an incidence side, and blue color separation prism 221, red color separation prism 222, and green color separation prism 223 are attached in this order in an optical axis direction.

Imaging element 231 is disposed to face a light emitting surface of blue color separation prism 221. Imaging element 232 is disposed to face a light emitting surface of red color separation prism 222. Imaging element 233 is disposed to face a light emitting surface of green color separation prism 223.

Imaging elements 231, 232, and 233 include, for example, a charge coupled device (CCD) or a complementary metal oxide semiconductor (CMOS). Imaging elements 231, 232, and 233 covert, for example, an optical image in which light, which is separated into each color of R, G, and B, is formed on each imaging surface into an electric signal.

Sensitivity of a general imaging element is high in a wavelength range of visible light, but is low in a wavelength range of near infrared light. Even in this case, for example, in the wavelength range of visible light, when transmittance of light incident on imaging elements 231, 232, and 233 is deteriorated, balance between sensitivity in the wavelength range of visible light and sensitivity in the wavelength range of near infrared light can be secured. Each transmittance of the light incident on imaging elements 231, 232, and 233 respectively corresponds to an amount of the light of imaging elements 231, 232, and 233.

Synchronizing signal generator 36 generates a synchronization signal for synchronizing each part of imaging device 10. The synchronization signal is transmitted to, for example, encoder 31, element driving signal generator 32, and video signal processors 37, 38, and 39.

Element driving signal generator 32 generates an element driving signal for driving imaging elements 231, 232, and 233, and transmits the signals to element drivers 33, 34, and 35. Element driving signal generator 32 receives the synchronization signal from synchronizing signal generator 36, and operates element drivers 33, 34, and 35 so that deviation (for example, temporal deviation) is not generated in videos of each separated color component, for example.

Element drivers 33, 34, and 35 are operated in accordance with an element driving signal from element driving signal generator 32. Element driver 33 supplies power to imaging element 231, and drives imaging element 231. Element driver 34 supplies power to imaging element 232, and drives imaging element 232. Element driver 35 supplies power to imaging element 233, and drives imaging element 233.

Video signal processors 37, 38, and 39 receive the synchronization signal from synchronizing signal generator 36, and are operated on the basis of the synchronization signal. Accordingly, the video of each separated color is adjusted so that deviation (for example, temporal deviation) is not generated.

Video signal processor 37 performs a signal process in which an electric signal (for example, electric signal of blue color component) from imaging element 231 is converted into a video signal, and outputs the signal to encoder 31. Video signal processor 38 performs a signal process in which an electric signal (for example, electric signal of red color component) from imaging element 232 is converted into a video signal, and outputs the signal to encoder 31. Video signal processor 39 performs a signal process in which an electric signal (for example, electric signal of green color component) from imaging element 233 is converted into a video signal, and outputs the signal to encoder 31, and outputs the signal to encoder 31.

Encoder 31 adjusts the video signal of each color component so as not to generate deviation (for example, temporal deviation), and combines the video signal of each color component. Encoder 31 converts, for example, the combined video signal into a video signal able to be output by a monitor and outputs the signal.

Figure 2:
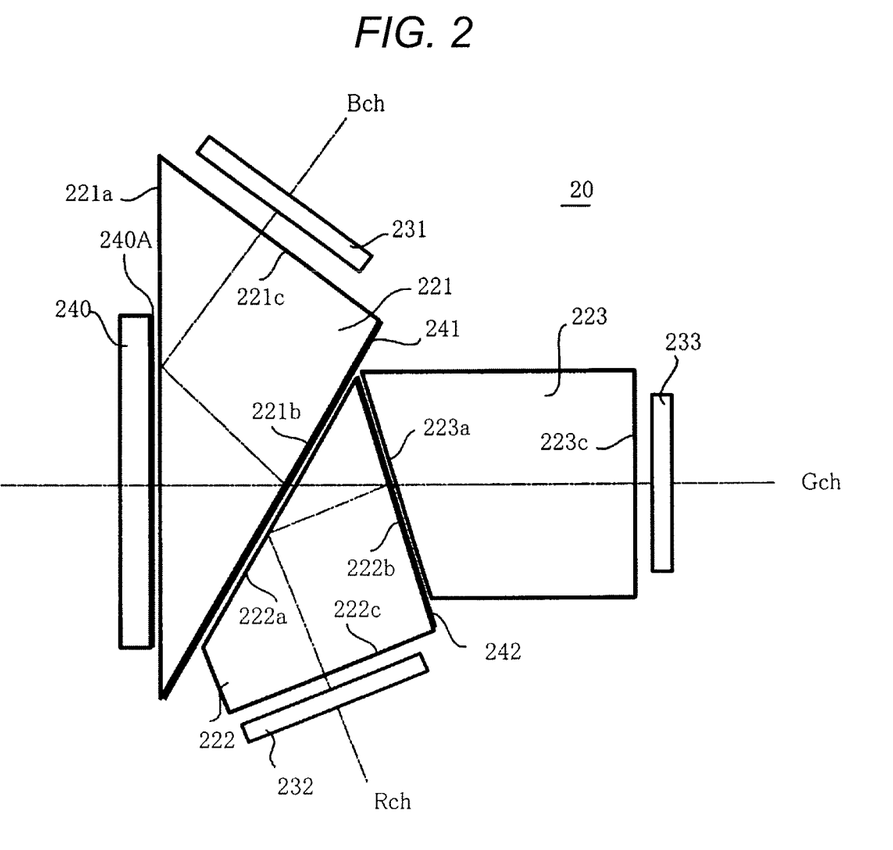
FIG. 2 is a perspective view illustrating an example of a structure of a color separation prism in the exemplary embodiment.

FIG. 2 is a perspective view illustrating an example of a structure of color separation prism 20.

In an incidence side of blue color separation prism 221, for example, IR cut filter 240 in which IR cut film 240A is formed on a surface thereof by deposition is disposed. For example, an air gap (air layer) of 0.5 mm to 1 mm is interposed between IR cut filter 240 and blue color separation prism 221.

In blue color separation prism 221, light (incident light) transmitted to IR cut filter 240 is incident on incidence surface 221a of blue color separation prism 221. Light reflected from reflective surface 221b facing incidence surface 221a is totally reflected to a boundary of incidence surface 221a from a glass inside of blue color separation prism 221 toward the air layer, is emitted from light emitting surface 221c facing incidence surface 221a, and is incident on imaging element 231. In reflective surface 221b, for example, blue reflective film 241 having spectroscopic properties to be described later is formed by deposition.

Blue color separation prism 221 reflects light of blue color component and a part (for example, 33%) of near infrared light (invisible light) of a specific wavelength range, among incident light beams, and transmits the other light beams (rest part (remnant) except light of red color component, light of green color component, and a part of near infrared light described above). Imaging element 231 allows incidence and receiving of light reflected from reflective surface 221b and incidence surface 221a.

Blue color separation prism 221 is formed so that light is progressed in blue color separation prism 221 described above. Also, the blue color component is an example of a first color component. The near infrared light is an example of invisible light.

In red color separation prism 222, light (incident light) transmitted to blue color separation prism 221 is incident on incidence surface 222a of red color separation prism 222. The light reflected from reflective surface 222b facing incidence surface 222a is totally reflected to a boundary of incidence surface 222a from a glass inside of red color separation prism 222 toward the air layer, is emitted from light emitting surface 222c facing incidence surface 222a, and is incident on imaging element 232. In reflective surface 222b, for example, red reflective film 242 including the spectroscopic properties to be described later is formed by deposition.

For example, 10 μm or less of an air gap is interposed between light emitting surface 221c of blue color separation prism 221 and incidence surface 222a of red color separation prism 222.

Red color separation prism 222 reflects the light of red color component and a part (for example, 50%) of near infrared light of the specific wavelength range, among the incident light beams, and the other light (rest part of red color component and near infrared light). Imaging element 232 allows incidence and receiving of the light reflected from reflective surface 222b and incidence surface 222a.

Red color separation prism 222 is formed so that light is progressed in red color separation prism 222 as described above. Also, the red color component is an example of a second color component.

In green color separation prism 223, the light (incident light) transmitted to red color separation prism 222 is incident on incidence surface 223a of green color separation prism 223, is emitted from light emitting surface 223c facing incidence surface 223a, and is incident on imaging element 233.

For example, 12 mm of air gap is interposed between light emitting surface 222c of red color separation prism 222 and incidence surface 223a of green color separation prism 223.

Green color separation prism 223 is formed so that the light is progressed in green color separation prism 223 as described above. Also, a green color component is an example of a third color component.

As described above, imaging device 10 is a triple plate type camera, which performs imaging using color separation prism 20 and three imaging elements 231, 232, and 233, different from a single plate type camera which performs imaging using one imaging element without using a prism. Also, in a case of the triple plate type camera, it is capable of imaging in a pixel shifting method. In this case, image quality of an image imaged by imaging device 10 can be improved, for example, twice.

Figure 3:
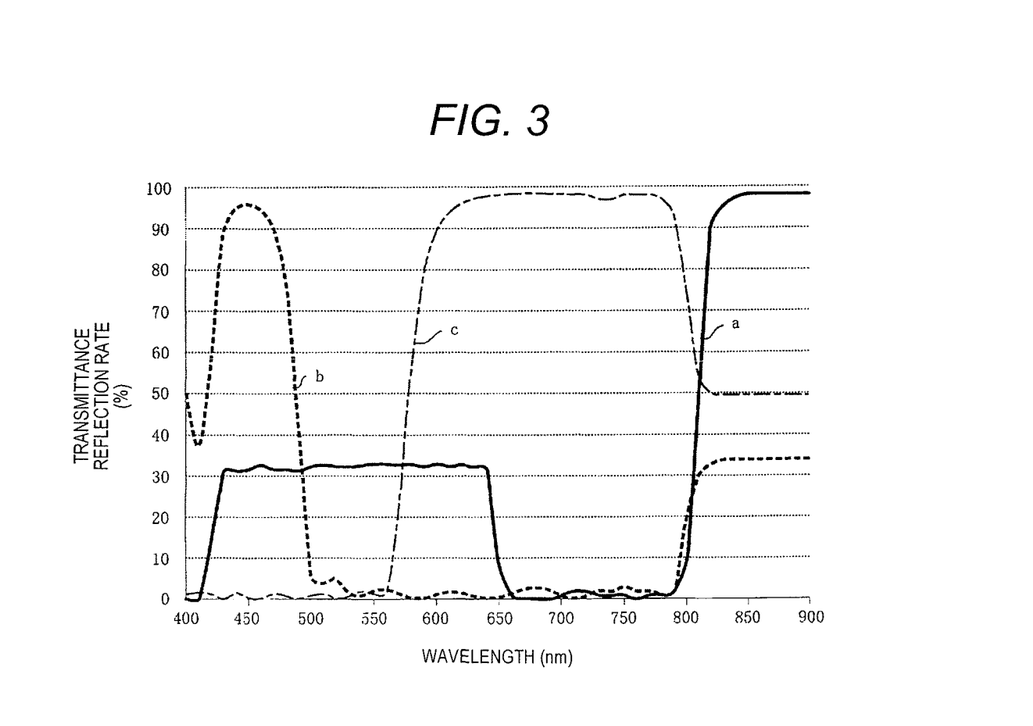
FIG. 3 is a graph illustrating an example of spectroscopic properties of the color separation prism in the exemplary embodiment.

FIG. 3 is a graph illustrating an example of the spectroscopic properties of color separation prism 20. In FIG. 3, the spectroscopic properties of each reflective film (blue reflective film 241 and red reflective film 242) and the spectroscopic properties of IR cut film 240A are illustrated. The spectroscopic properties of each reflective film indicates a relationship between a wavelength of incident light to each reflective film and reflectance of each reflective film. The spectroscopic properties of IR cut film 240A indicates a relationship between a wavelength of incident light to IR cut film 240A and transmittance of IR cut film 240A.

A vertical axis of the graph of FIG. 3 indicates reflectance of each reflective film and transmittance of IR cut film 240A. Also, the light reflected from each reflective film is totally reflected to the incidence surface and is emitted from the light emitting surface. Therefore, the reflectance of each reflective film corresponds to a light receiving ratio by imaging elements 231, 232, and 233 (ratio of an amount of light of incident light to each prism and an amount of light of incident light to the imaging element corresponding to each prism), and corresponds to each transmittance of a blue color channel, a red color channel, a green color channel to be described later. A horizontal axis of the graph of FIG. 3 indicates the wavelength (nm) of incident light to each reflective film and IR cut film 240A.

In FIG. 3, waveform a (solid line) indicates an example of the spectroscopic properties of IR cut film 240A. Waveform b (dotted line) indicates an example of the spectroscopic properties of blue reflective film 241. Waveform c (dashed line) indicates an example of the spectroscopic properties of red reflective film 242.

As waveform a, transmittance of IR cut film 240A in approximately 420 nm to 650 nm is set to approximately 33%. Transmittance of IR cut film 240A in approximately 650 nm to 810 nm is set to approximately 0%. Transmittance of IR cut film 240A in approximately 810 nm to 900 nm is set to approximately 100%. When transmittance of IR cut film 240A in approximately 810 nm to 900 nm is set to approximately 100%, deterioration of sensitivity of imaging elements 231, 232, and 233 can be suppressed.

As shown by waveform b, reflectance of blue reflective film 241 in approximately 420 nm to 490 nm is set to approximately 100%. The reflectance of blue reflective film 241 in approximately 490 nm to 810 nm is set to approximately 0%. The reflectance of blue reflective film 241 in approximately 810 nm to 900 nm is set to approximately 33%.

As shown by waveform c, reflectance of red reflective film 242 in approximately 420 nm to 580 nm is set to approximately 0%. The reflectance of red reflective film 242 in approximately 580 nm to 810 nm is set to approximately 100%. The reflectance of red reflective film 242 in approximately 810 nm to 900 nm is set to approximately 50%.

Moreover, since ICG is fluorescent, a wavelength of excitation light irradiated to an affected part is included in the wavelength range of 760 nm to 800 nm. In all of imaging element 231 for blue color, imaging element 232 for red color, and imaging element 233 for green color, transmittance or reflectance of the wavelength range of 760 nm to 800 nm is set to zero value, so that the excitation light is not reflected to an image being imaged by imaging elements 231, 232, and 233. The wavelength range of 760 nm to 800 nm is an example of a first wavelength range.

Meanwhile, a wavelength of fluorescent light from which the affected part is emitted, excited by the excitation light, is included in the wavelength range of 820 nm to 860 nm. Therefore, in each imaging element, a light receiving ratio of the wavelength range of 820 nm to 860 nm is set to, for example, 33% (refer to FIG. 5D). Accordingly, since reflecting of excitation light from a light source to the imaging image can be suppressed, color reproducibility of the imaging image can be improved, and the affected part can be clearly observed. The wavelength range of 820 nm to 860 nm is an example of a second wavelength range.

Figure 4:
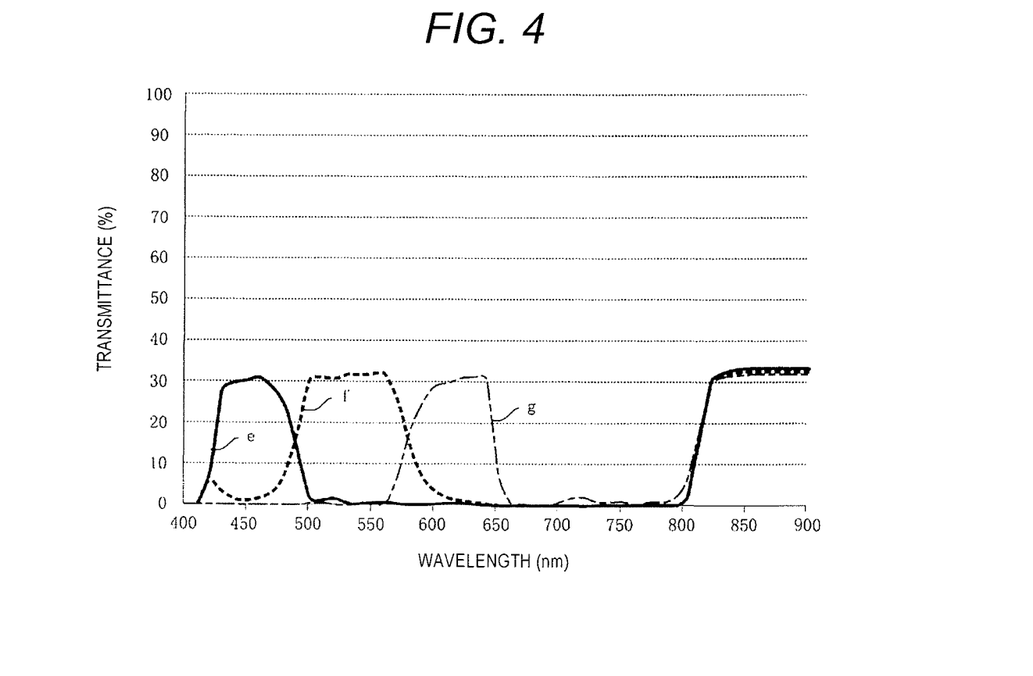
FIG. 4 is a graph illustrating an example of spectroscopic properties of each channel in the exemplary embodiment.

FIG. 4 is a graph illustrating the spectroscopic properties of each channel. The channels indicate a light passage for guiding light of each color component into the imaging element (imaging elements 231, 232, and 233) of each color. Spectroscopic properties of the channel indicates a ratio of emitting light (incident light to imaging element) emitted to the imaging element of each color with respect to an amount of the light of incident light to the prisms (blue color separation prism 221, red color separation prism 222, green color separation prism 223) of each color. Here, the ratio is shown as the transmittance of the channel.

A vertical axis of a graph of FIG. 4 illustrates transmittance of each channel. A horizontal axis of the graph of FIG. 4 illustrates a wave length (nm) of light. Waveform e (solid line) indicates an example of spectroscopic properties of blue color channel. Waveform f (dotted line) indicates an example of spectroscopic properties of green color channel. Waveform g (dashed line) indicates an example of spectroscopic properties of red color channel.

As shown by waveform e, transmittance of blue color channel in approximately 420 nm to 490 nm is set to approximately 33%. The transmittance of blue color channel in approximately 490 nm to 810 nm is set to approximately 0%. The transmittance of blue color channel in approximately 810 nm to 900 nm is set to approximately 33%.

As shown by waveform f, transmittance of green color channel in approximately 420 nm to 490 nm is set to approximately 0%. The transmittance of green color channel in approximately 490 nm to 580 nm is set to approximately 33%. The transmittance of green color channel in approximately 580 nm to 810 nm is set to approximately 0%. The transmittance of green color channel in approximately 810 nm to 900 nm is set to approximately 33%.

As shown by waveform g, transmittance of red color channel in approximately 420 nm to 580 nm is set to approximately 0%. The transmittance of red color channel in approximately 580 nm to 650 nm is set to approximately 33%. The transmittance of red color channel in approximately 650 nm to 810 nm is set to approximately 0%. The transmittance of red color channel in approximately 810 nm to 900 nm is set to approximately 33%.

In a case of the spectroscopic properties illustrated in FIG. 3 and FIG. 4, a peak of transmittance in the wavelength range (approximately 420 nm to 650 nm) of visible light is suppressed to approximately 33%, when compared a prism where the visible light is transmitted to 100%. In addition, in the wavelength range of visible light, a half value wavelength is set to be the same as that of, for example, a prism of the related art. The half value wavelength is half with respect to the peak of the transmittance of the channel, that is, a wavelength where the transmittance is 50%.

The wavelength range (for example, 650 nm to 900 nm) of near infrared light, even in each channel, is approximately 810 nm or less, and the transmittance of the channel is approximately 0%. In approximately 810 nm or more, the transmittance is 33%. That is, for example, infrared light having a wavelength of the wavelength range of 810 nm or more can be recognized. Since each color component of visible light and near infrared light can be recognized by adjusting the amount of the light at such a degree, emphasizing and displaying of either of visible light or infrared light can be suppressed.

FIG. 5A to FIG. 5D are perspective views for describing an example of the transmittance of each channel of color separation prism 20. In FIG. 5A to FIG. 5D, the transmittance is indicated by a numeral value (%).

Figure 5A:
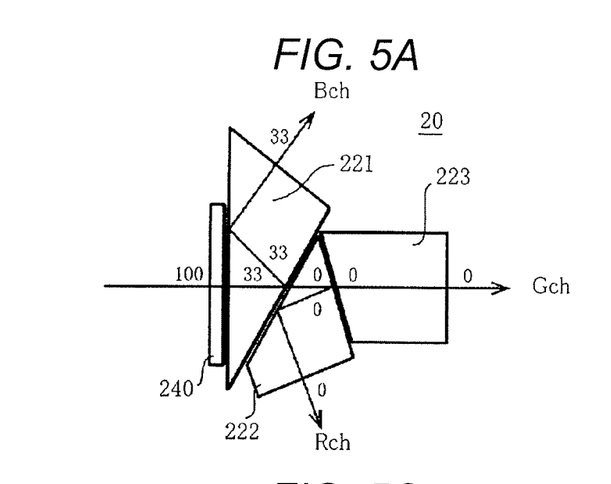
FIG. 5A is a perspective view for describing an example of transmittance at a wavelength of 420 nm to 490 nm of the color separation prism in the exemplary embodiment.

FIG. 5A indicates the transmittance of each channel with respect to incident light of a wavelength 420 nm to 490 nm to color separation prism 20. In a case in which the light of the wavelength 420 nm to 490 nm is incident on color separation prism 20, among the incident light beams, 66% of light is blocked by IR cut filter 240, 33% of light is transmitted, and the light is incident on blue color separation prism 221.

The 33% light incident on blue color separation prism 221 is reflected from reflective surface 221b where blue reflective film 241 is formed, and is totally reflected to incidence surface 221a of blue color separation prism 221. Then, the light of which an amount of light transmitted to as 33% is maintained is emitted from light emitting surface 221c of blue color separation prism 221, and imaging element 231 receives the light. Accordingly, in imaging element 231, light (approximately, blue light) having a wavelength of 420 nm to 490 nm is incident at 33% transmittance.

Figure 5B:
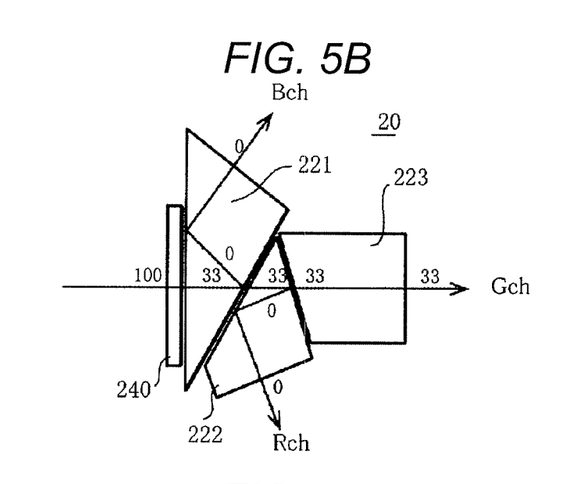
FIG. 5B is a perspective view for describing an example of transmittance at a wavelength of 490 nm to 580 nm of the color separation prism in the exemplary embodiment.

FIG. 5B illustrates the transmittance of each channel with respect to incident light having the wavelength of 490 nm to 580 nm to color separation prism 20. In a case in which the light having the wavelength of 490 nm to 580 nm is incident on color separation prism 20, among the incident light beams, 66% of light is blocked by IR cut filter 240, 33% of the light is transmitted, and is incident on blue color separation prism 221.

33% of the light incident on blue color separation prism 221 is transmitted to reflective surface 221b in which blue reflective film 241 is formed and is incident on red color separation prism 222, and is transmitted to light emitting surface 222c in which red reflective film 242 is formed. The light of which an amount of light transmitted to as 33% is maintained is emitted from light emitting surface 223c of green color separation prism 223, and imaging element 233 receives the light. Accordingly, in imaging element 233, the light (approximately, green light) having the wavelength of 490 nm to 580 nm is incident at 33% transmittance.

Figure 5C:
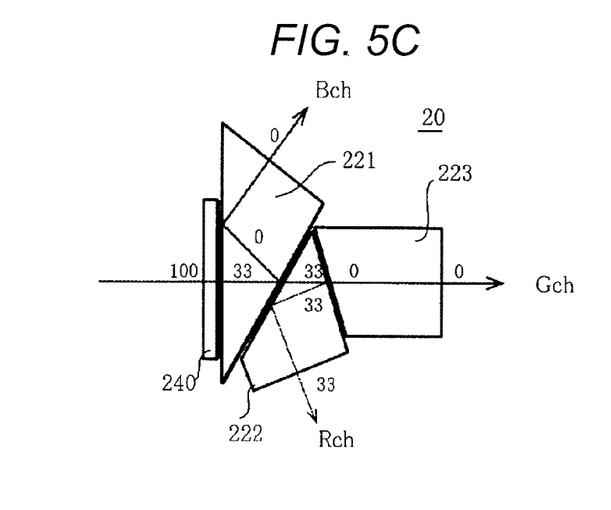
FIG. 5C is a perspective view for describing an example of transmittance at a wavelength of 580 nm to 650 nm of the color separation prism in the exemplary embodiment.

FIG. 5C illustrates the transmittance of each channel with respect to incident light having wavelength of 580 nm to 650 nm to color separation prism 20. In a case in which the light having the wavelength of 580 nm to 650 nm is incident on color separation prism 20, among the incident light beams, 66% of the light is blocked by IR cut filter 240, 33% of the light is transmitted, and the light is incident on blue color separation prism 221.

33% of the light incident on blue color separation prism 221 is transmitted to reflective surface 221b in which blue reflective film 241 is formed, and is incident on red color separation prism 222. 33% of the light incident on red color separation prism 222 is reflected from reflective surface 222b in which red reflective film 242 is formed, and is totally reflected to incidence surface 222a of red color separation prism 222. Then, the light of which an amount of light transmitted to as 33% is maintained is emitted from light emitting surface 222c of red color separation prism 222, and imaging element 232 receives the light. Accordingly, in imaging element 232, light (approximately; red light) having a wavelength of 580 nm to 650 nm is incident at 33% transmittance.

Figure 5D:
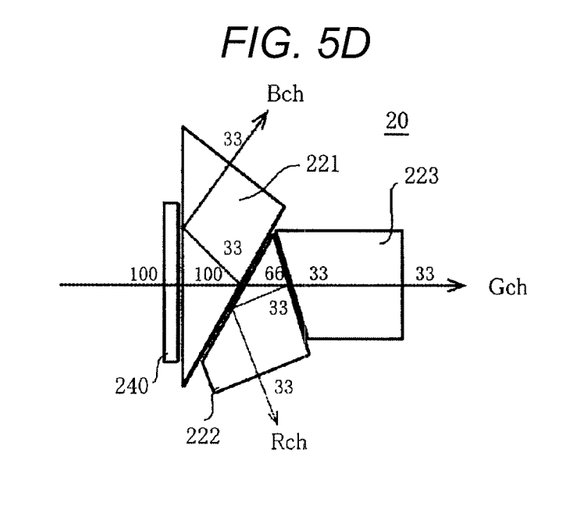
FIG. 5D is a perspective view for describing an example of transmittance at a wavelength of 810 nm to 900 nm of the color separation prism in the exemplary embodiment.

FIG. 5D illustrates the transmittance of each channel with respect to incident light of a wavelength of 810 nm to 900 nm to color separation prism 20. In a case in which the light having the wavelength of 810 nm to 900 nm is incident on color separation prism 20, the incident light is not blocked by IR cut filter 240, that is, is transmitted to IR cut filter 240 at 100% transmittance, and is incident on blue color separation prism 221.

33% of 100% light incident on blue color separation prism 221 is reflected to reflective surface 221b in which blue reflective film 241 is formed so as to be light having an amount of light transmitted to as 33%, and is incident on imaging element 231. 66% of the light, which is not reflected to blue color separation prism 221 and transmitted to blue color separation prism 221, is incident on red color separation prism 222, 50% thereof is reflected to reflective surface 222b in which red reflective film 242 is formed so as to be light having an amount of light transmitted to as 33%, and is incident on imaging element 232. 33% of the light transmitted to reflective surface 222b of red color separation prism 222 is incident on imaging element 233.

Accordingly, in imaging device 10, IR cut filter 240 which transmits visible light as, for example, 33% is disposed on the incidence side of blue color separation prism 221. Blue color separation prism 221 is formed so that the light reflected from reflective surface 221b is incident on imaging element 231. Blue reflective film 241 is formed on reflective surface 221b. Blue color separation prism 221 reflects blue color component and a part of near infrared light (for example, 33%), and transmits the other light beams.

Red color separation prism 222 is formed so that the light reflected from reflective surface 222b is incident on imaging element 232. Red reflective film 242 is formed on reflective surface 222b. Red color separation prism 222 reflects the light of red color component and a part (for example, 50%) of near infrared light, and transmits the other light beams.

Green color separation prism 223 is formed so that the light of the incident green color component is incident on imaging element 233.

More described in detail, IR cut filter 240 transmits a part of a component in a wavelength range of, for example, 420 nm to 650 nm of the light from an object, blocks a component in a wavelength range of, for example, 650 nm to 810 nm, and transmits a component in a wavelength range of, for example, 810 nm to 900 nm.

Blue reflective film 241 reflects light of a component in a wavelength range of, for example, 420 nm to 490 nm, transmits light of a component in a wavelength range of, for example, 490 nm to 810 nm, and reflects light of a component in a wavelength range of, for example, 810 nm to 900 nm as, for example, 33% thereof.

Red reflective film 242 transmits light of a component in a wavelength range of, for example, 420 nm to 580 nm, reflects light of a component in a wavelength range of, for example, 580 nm to 810 nm, and reflects light of a component in a wavelength range of, for example, 810 nm to 900 nm as, for example, 50% thereof.

Therefore, transmittance (light receiving ratio) of the light of blue color, green color, and red color which are respectively incident on each imaging elements 231, 232, and 233 is, for example, respectively 33%. The transmittance (light receiving ratio) of the near infrared light incident on imaging elements 231, 232, and 233 is, for example, respectively 33%. That is, blue reflective film 241 and red reflective film 242 allocate an amount of the light of invisible light being emitted to imaging elements 231, 232, and 233 so as to obtain substantially uniform amount of the light. In addition, blue reflective film 241 and red reflective film 242 allocate an amount of the light of visible light being emitted to imaging elements 231, 232, and 233.

Accordingly, imaging device 10 can image a color image of high resolution having color reproducibility close to, for example, visual, and a fluorescence emitting image of near infrared region which is not close to the visual, as the same image.

The light due to the fluorescence emitting having a wavelength in the wavelength range of the near infrared light is uniformly incident on imaging elements 231, 232, and 233 for blue (B), red (R), and green (G) at the same transmittance (33%), and thus the light can be recognized as white. Therefore, in the imaging image, a fluorescence emitting part (for example, affected part) can be discriminated from a color of another part (for example, blood vessel of red color), and thus the affected part can be easily identified. Also, allocation of the amount of the light in this case is performed by, for example, IR cut filter 240, blue reflective film 241, and red reflective film 242.

The amount of light of the near infrared light incident on the three imaging elements 231, 232, and 233 becomes approximately a third of the amount of light of the near infrared light from the object, and thus sensitivity of the near infrared region of a white reflected image of the object (for example, affected part) can be improved. The allocation of the amount of light in this case is performed by, for example, IR cut filter 240, blue reflective film 241, and red reflective film 242.

IR cut filter 240 transmits, for example, 33%±10% of the visible light (for example, 420 nm to 650 nm) from the object, and thus the amount of light of visible light of each color component incident on imaging elements 231, 232, and 233 respectively becomes approximately a third of the visible light from the object. Accordingly, in accordance with the sensitivity with respect to near infrared light imaging elements 231, 232, and 233, the sensitivity of the visible light can be deteriorated, and the sensitivity of the near infrared light and the visible light can be equalized.

A wavelength of excitation light which is irradiated in order to excite ICG is 760 nm to 800 nm. Therefore, in the wavelength range of the near infrared light, a half value wavelength by IR cut filter 240 is set to, for example, 810 nm±10 nm. Accordingly, imaging device 10 is capable of blocking the excitation light by IR cut filter 240, and suppressing incidence on imaging elements 231, 232, and 233.

Meanwhile, the wavelength of the fluorescence emitting ICG is 820 nm to 860 nm, and fluorescence emitting light from the affected part as the object is incident on each imaging elements 231, 232, and 233. Accordingly, since the excitation light is not reflected to the imaging image, but fluorescence emitting light of the ICG is reflected to the imaging image as for example, white, and a user of imaging device 10 can clearly recognize the affected part which is fluorescence-emitted due to the ICG.

In addition, when near infrared light is used as invisible light, influence on a patient due to ultraviolet radiation, or the like can be reduced.

Hitherto, various exemplary embodiment s have been described with reference to the drawings, but it is needless to say that the invention is not limited to the examples described above. It is apparent that those skilled in the art reach various modification examples and revised examples within a range disclosed in claims, and thus it is understood that these examples belong to a technical range of the invention of course.

In the exemplary embodiment described above, although it is exemplified that the ICG is administrated into a body as an optical contrast agent, the optical contrast agent other than the ICG may be administrated. In this case, spectroscopic properties in a wavelength range of invisible light may be determined in accordance with a wavelength of excitation light for exciting the optical contrast agent. That is, transmittance of each channel in a wavelength range other than approximately 760 nm to 800 nm may be set to 0%. For example, fluorescence emitting medicine in a wavelength range of ultraviolet light may be used. Even in this case, in the same manner as that of a case in which the fluorescence emitting optical contrast agent in the near infrared region is used, imaging device 10 is capable of imaging an image of the affected part which is fluorescence-emitted.

In the exemplary embodiment as described above, although it is exemplified that transmittance of a wavelength range of visible light by IR cut filter 240 is set to 33%, transmittance may be modified within a range in which, for example, color reproducibility or resolution of the visible light is secured. That is, the transmittance may be smaller than 33%, and may be greater than 33% (for example, 50% or 70%). For example, even when the transmittance of the visible light of IR cut filter 240 is 50% or 70%, an image quality is not significantly deteriorated.

In the exemplary embodiment as described above, it is exemplified that blue color separation prism 221, red color separation prism 222, and green color separation prism 223 are disposed from the incidence side of the light in color separation prism 20 in this order, but this disposing order is an example, and the prisms may be disposed in another disposing order.

(Outline of Aspect of Invention)

A color separation prism of an aspect of the invention separates light from an object into three primary colors. The color separation prism includes a filter, a first prism, a first reflective film, a second prism, a second reflective film, and a third prism. Light from the object is incident on the filter, and the filter transmits a part of visible light from the object, and invisible light in a predetermined wavelength band of the object. The light transmitted to the filter is incident on the first prism. The first reflective film is formed on the first prism. The light transmitted to the first reflective film is incident on the second prism. The second reflective film is formed on the second prism. The light transmitted to the second reflective film is incident on the third prism. The first prism emits the light reflected from the first reflective film to a first imaging element. The first reflective film reflects the first color component of visible light and a part of invisible light, and transmits the second color component and the third color component of the visible light, remnant of the invisible light, among the light beams incident on the first prism. The second prism emits the transmitted to the second reflective film to a second imaging element. The second reflective film reflects the second color component of the visible light and a part of the invisible light, and transmits the third color component and remnant of the invisible light, among the light beams incident on the second prism. The third prism emits the light transmitted to the second reflective film to a third imaging element. The first reflective film and the second reflective film allocate the amount of light of the invisible light being emitted to the first imaging element, the second imaging element, and the third imaging element so as to obtain approximately uniform amount of the light, and allocate the amount of light of the visible light emitted to the first imaging element, the second imaging element, and the third imaging element so as to obtain approximately uniform amount of the light.

According to this configuration, since the color separation prism approximately uniformly allocates each color component of the visible light into each imaging element dealing with three primary colors, color reproducibility and resolution in the wavelength range of the visible light can be improved. In addition, since the color separation prism approximately uniformly allocates each color component of the invisible light into each imaging element dealing with three primary colors, color reproducibility and resolution in the wavelength range of the invisible light can be improved.

In the color separation prism of the aspect of the invention, the filter, the first reflective film, the second reflective film allocate the amount of light of the invisible light being emitted to the first imaging element, the second imaging element, and the third imaging element so that the amount of the invisible light being incident on the filter approximately becomes a third of the amount of light.

According to the configuration, the invisible light is incident on each imaging element at the same transmittance, and thus the light can be recognized as white. Therefore, for example, in a case in which a subject in the wavelength range of the invisible light is fluorescence emitted, a fluorescence emitted part (for example, affected part) can be discriminated from a color of another part (for example, red color blood vessel), and therefore, the affected part can be easily identified.

In the color separation prism of the aspect of the invention, the filter, the first reflective film, the second reflective film allocate the amount of light of the invisible light being emitted to the first imaging element, the second imaging element, and the third imaging element so that the amount of the visible light being incident on the filter approximately becomes a third of the amount of light.

According to the configuration, sensitivity of each imaging element with respect to the visible light can be approximately equally reduced in accordance with sensitivity with respect to the invisible light, and the sensitivity of the near infrared light and the visible light can be equalized. Therefore, a subject having the wavelength range of the invisible light in the imaging image and a subject having the wavelength range of visible light can be recognized with good balance.

The color separation prism of the aspect of the invention blocks a component of the first wavelength band including the wavelength of the invisible light of which an optical source is emitted with respect to the object using a filter, among the invisible light beams from the object, and transmits a component of the second wavelength band including the wavelength of fluorescent emitting light excited by the invisible light of which the optical source is emitted.

According to the configuration, for example, the excitation light for exciting an optical contrast agent which is administrated into a body is not included in the imaging image, and a part which is fluorescence-emitted by the excitation light can be included in the imaging image. Therefore, for example, a doctor can easily recognize an affected part inside the body.

In the color separation prism of the aspect of the invention, the invisible light is infrared light.

According to the configuration, for example, in a case in which the invisible light is irradiated to the body, influence on a patient due to ultraviolet radiation, or the like can be reduced.

In the color separation prism of the aspect of the invention, the filter transmits a part of the component of the wavelength band of approximately 420 nm to 650 nm of the light from the object, blocks the component of the wavelength band of approximately 650 nm to 810 nm, and transmits the component of the wavelength band of 810 nm to 900 nm. The first reflective film reflects the component of the wavelength band of approximately 420 nm to 490 nm of the light incident on the first prism, transmits the component of the wavelength band of approximately 490 nm to 810 nm, and reflects approximately 33% of the component of the wavelength band of 810 nm to 900 nm. The second reflective film transmits the component of the wavelength band of approximately 420 nm to 580 nm of the light incident on the second prism, reflects the component of the wavelength band of approximately 580 nm to 810 nm, and reflects approximately 50% of the component of the wavelength band of approximately 810 nm to 900 nm.

According to the configuration, since the blue color component, the red color component, and the green color component of the visible light are approximately uniformly allocated to each imaging element dealing with three primary colors, color reproducibility and resolution in the wavelength range of the visible light can be improved. Since the invisible light is approximately uniformly allocated to each imaging element dealing with three primary colors, color reproducibility and resolution in the wavelength range of the invisible light can be improved. Therefore, a color image of high resolution having color reproducibility close to, for example, visual, and a fluorescence emitting image of which a subject is fluorescent in the wavelength range of the invisible light which is invisible, can be imaged as the same image.

In the color separation prism of the aspect of the invention, the filter transmits approximately 33%±10% of the component of the wavelength band of approximately 420 nm to 650 nm of the light from the object.

According to the configuration, sensitivity of each imaging element with respect to the visible light can be almost reduced in accordance with sensitivity with respect to the invisible light, and the sensitivity of the near infrared light and the visible light can be equivalent. Therefore, the subject including the wavelength range of the invisible light in the imaging image and the subject including the wavelength range of the visible light can be recognized with good balance.

In the color separation prism of the aspect of the invention, the filter, the first reflective film, and the second reflective film include a half value wavelength in approximately the wavelength band of 810 nm±10 nm.

According to the configuration, for example, the excitation light for exciting the ICG administrated into the body is not included in the imaging image, and a part which is near-infrared fluorescence-emitted by the excitation light can be included in the imaging image. Therefore, for example, a doctor can easily recognize the affected part (for example, tumor) inside the body.

The imaging device of the aspect of the invention includes the color separation prism which separates the light from the object into three primary colors, the first imaging element, the second imaging element, and the third imaging element which image the optical image of the separated light by the color separation prism. The filter that allows incidence of the light from the object and transmits a part of the visible light from the object and the invisible light of a predetermined wavelength band from the object, the first prism that allows incidence of the light transmitted to the filter, the first reflective film that is formed on the first prism, the second prism that allows incidence of the light transmitted to the first reflective film, the second reflective film that is formed on the second prism, and the third prism that allows incidence of the light transmitted to the second reflective film. The first prism emits the light reflected from the first reflective film to a first imaging element, and the first reflective film reflects a first color component of the visible light and a part of the invisible light and transmits a second color component and a third color component of the visible light and remnant of the invisible light, among the light beams incident on the first prism. The second prism emits the light reflected from the second reflective film to a second imaging element, and the second reflective film reflects the second color component of the visible light and a part of the invisible light and transmits the third color component and remnant of the invisible light, among the light beams incident on the second prism. The third prism emits the light transmitted to the second reflective film to a third imaging element, and the first reflective film and the second reflective film allocate the invisible light being emitted to the first imaging element, the second imaging element, and the third imaging element so as to obtain approximately uniform amount of the light and allocate the visible light being emitted to the first imaging element, the second imaging element, and the third imaging element so as to obtain approximately uniform amount of the light.

According to the configuration, since each color component of the visible light is approximately uniformly allocated to each imaging element dealing with three primary colors, color reproducibility and resolution in the wavelength range of visible light can be improved. Since each color component of the invisible light is approximately uniformly allocated to each imaging element dealing with three primary colors, color reproducibility and resolution in the wavelength range of visible light can be improved. Therefore, for example, a color image of high resolution having color reproducibility close to, for example, visual, and a fluorescence emitting image of which the subject is fluorescent-emitted in the wavelength range of the invisible light which is not close to the visual can be imaged as the same image.

INDUSTRIAL APPLICABILITY

The invention is used for the color separation prism, the imaging device, and the like, which are capable of improving color reproducibility and resolution in the wavelength range of the visible light and the invisible light.

REFERENCE MARKS IN THE DRAWINGS 10 imaging device
14 lens
20 color separation prism
31 encoder
32 driving signal generator
33, 34, 35 element driver
36 synchronization signal generator
37, 38, 39 video signal processor
221 blue color separation prism
221a, 222a, 223a incidence surface
221b, 222b reflective surface
221c, 222c, 223c light emitting surface
222 red color separation prism
223 green color separation prism
231, 232, 233 imaging element
240 IR cut filter
240A IR cut film
241 blue reflective film
242 red reflective film

The invention claimed is:
1. A color separation prism which separates light from an object into three primary colors, the color separation prism comprising:
    a filter that allows incidence of the light from the object and transmits, as filtered visible light, a predetermined percent of intensity of visible light of a first predetermined wavelength band from the object and transmits, as filtered invisible light, invisible light of a second predetermined wavelength band from the object;
a first prism that allows incidence of the filtered visible light and the filtered invisible light transmitted through the filter;
a first reflective film that is on the first prism, reflects a first color component of the filtered visible light, reflects a second predetermined percent of intensity of the filtered invisible light, transmits a second color component and a third color component of the filtered visible light, and transmits a first remnant of the filtered invisible light;
a second prism that allows incidence of the second color component and the third color component of the filtered visible light and the first remnant of the filtered invisible light transmitted through the first reflective film;
a second reflective film that is on the second prism, reflects the second color component of the filtered visible light, reflects a third predetermined percent of intensity of the first remnant of the filtered invisible light, transmits the third color component of the filtered visible light, and transmits a second remnant of the filtered invisible light; and
a third prism that allows incidence of the third color component of the filtered visible light and the second remnant of the filtered invisible light transmitted through the second reflective film,
wherein the first prism emits the first color component of the filtered visible light and the second predetermined percent of intensity of the filtered invisible light reflected from the first reflective film to a first imaging element,
wherein the second prism emits the second color component of the filtered visible light and the third predetermined percent of intensity of the first remnant of the filtered invisible light reflected from the second reflective film to a second imaging element,
wherein the third prism emits the third color component of the filtered visible light and the second remnant of the filtered invisible light transmitted through the second reflective film to a third imaging element,
wherein the filter transmits, as the filtered invisible light, approximately 100% of the invisible light of the second predetermined wavelength band, and the first reflective film and the second reflective film allocate the filtered invisible light being emitted to the first imaging element, the second imaging element, and the third imaging element so as to obtain, by the first imaging element, the second imaging element, and the third imaging element, approximately equal intensity percentages of the filtered invisible light, and
wherein the filter transmits, as the filtered visible light, approximately a third of an intensity of the visible light of the first predetermined wavelength band, as the predetermined percent of intensity of the visible light of the first predetermined wavelength band, and the first reflective film and the second reflective film allocate the filtered visible light being emitted to the first imaging element, the second imaging element, and the third imaging element so as to respectively obtain, by the first imaging element, the second imaging element, and the third imaging element, approximately equal intensity percentages of the filtered visible light in the first color component, the second color component, and the third color component.

2. The color separation prism of claim 1,
wherein the first reflective film and the second reflective film allocate the filtered invisible light so that approximately a third of an intensity of the filtered invisible light is emitted to each of the first imaging element, the second imaging element, and the third imaging element.

3. The color separation prism of claim 2,
wherein the first reflective film and the second reflective film allocate the filtered visible light so that approximately the third of the intensity of the visible light is emitted to the first imaging element, the second imaging element, and the third imaging element in each of the first color component, the second color component, and the third color component, respectively.

4. The color separation prism of claim 1,
wherein the filter blocks the invisible light of a third predetermined wavelength band from the object, and
the filter transmits the invisible light of the second predetermined wavelength band, with the second predetermined wavelength band including fluorescence.

5. The color separation prism of claim 1,
wherein the invisible light is infrared light.

6. The color separation prism of claim 1,
wherein the first predetermined wavelength band is approximately 420 nm to 650 nm, the filter blocks a fourth predetermined percent of intensity of a wavelength band of approximately 650 nm to 810 nm, and the second predetermined wavelength band is approximately 810 nm to 900 nm,
wherein the first reflective film reflects a wavelength band of approximately 420 nm to 490 nm, transmits a wavelength band of approximately 490 nm to 810 nm, and reflects approximately 33% of an intensity of a wavelength band of 810 nm to 900 nm, and
wherein the second reflective film transmits a wavelength band of approximately 420 nm to 580 nm, reflects a wavelength band of approximately 580 nm to 810 nm, and reflects approximately 50% of the intensity of the wavelength band of approximately 810 nm to 900 nm.

7. The color separation prism of claim 6,
wherein the filter transmits approximately 33%±10% of the intensity of the wavelength band of approximately 420 nm to 650 nm of the light from the object.

8. The color separation prism of claim 6,
wherein the filter, the first reflective film, and the second reflective film include a half value wavelength in the wavelength band of approximately 810 nm±10 nm.

9. An imaging device comprising:
a color separation prism that separates light from an object into three primary colors; and
a first imaging element, a second imaging element, and a third imaging element that image an optical image of the light separated by the color separation prism,
wherein the color separation prism includes:
a filter that allows incidence of the light from the object and transmits, as filtered visible light, a predetermined percent of intensity of visible light of a first predetermined wavelength band from the object and transmits, as filtered invisible light, invisible light of a second predetermined wavelength band from the object;
a first prism that allows incidence of the filtered visible light and the filtered invisible light transmitted through the filter;
a first reflective film that is on the first prism, reflects a first color component of the filtered visible light, reflects a second predetermined percent of intensity of the filtered invisible light, transmits a second color component and a third color component of the filtered visible light, and transmits a first remnant of the filtered invisible light;

a second prism that allows incidence of the second color component and the third color component of the filtered visible light and the first remnant of the filtered invisible light transmitted through the first reflective film;

a second reflective film that is on the second prism, reflects the second color component of the filtered visible light, reflects a third predetermined percent of intensity of the first remnant of the filtered invisible light, transmits the third color component of the filtered visible light, and transmits a second remnant of the filtered invisible light; and a third prism that allows incidence of the third color component of the filtered visible light and the second remnant of the filtered invisible light transmitted through the second reflective film, wherein the first prism emits the first color component of the filtered visible light and the second predetermined percent of intensity of the filtered invisible light reflected from the first reflective film to the first imaging element, wherein the second prism emits the second color component of the filtered visible light and the third predetermined percent of intensity of the first remnant of the filtered invisible light reflected from the second reflective film to the second imaging element, wherein the third prism emits the third color component of the filtered visible light and the second remnant of the filtered invisible light transmitted to the second reflective film to the third imaging element, wherein the filter transmits, as the filtered invisible light, approximately 100% of the invisible light of the second predetermined wavelength band, and the first reflective film and the second reflective film allocate the filtered invisible light being emitted to the first imaging element, the second imaging element, and the third imaging element so as to obtain, by the first imaging element, the second imaging element, and the third imaging element, approximately equal intensity percentages of the filtered invisible light, and wherein the filter transmits, as the filtered visible light, approximately a third of an intensity of the visible light of the first predetermined wavelength band, as the predetermined percent of intensity of the visible light of the first predetermined wavelength band, and the first reflective film and the second reflective film allocate the filtered visible light being emitted to the first imaging element, the second imaging element, and the third imaging element so as to respectively obtain, by the first imaging element, the second imaging element, and the third imaging element, approximately equal intensity percentages of the filtered visible light in the first color component, the second color component, and the third color component.

* * * * *